US 9,250,853 B2

(12) United States Patent
Yun et al.

(10) Patent No.: US 9,250,853 B2
(45) Date of Patent: Feb. 2, 2016

(54) ADHESIVE DISPLAY PANEL, CONNECTOR, AND ADHESIVE DISPLAY SYSTEM INCLUDING THE ADHESIVE DISPLAY PANEL AND CONNECTOR

(71) Applicant: Samsung Display Co., Ltd., Yongin (KR)

(72) Inventors: Suyeon Yun, Yongin (KR); Young-Seok Ji, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 125 days.

(21) Appl. No.: 14/140,119

(22) Filed: Dec. 24, 2013

(65) Prior Publication Data

US 2014/0375529 A1 Dec. 25, 2014

(30) Foreign Application Priority Data

Jun. 21, 2013 (KR) .................. 10-2013-0071945

(51) Int. Cl.
*G06F 3/14* (2006.01)
*G06F 1/16* (2006.01)

(52) U.S. Cl.
CPC ............ *G06F 3/1446* (2013.01); *G06F 1/1652* (2013.01); *G09G 2300/026* (2013.01)

(58) Field of Classification Search
CPC ................ G06F 3/1446; G06F 1/1652; G09G 2300/026
See application file for complete search history.

(56) References Cited

U.S. PATENT DOCUMENTS

| | | | |
|---|---|---|---|
| 5,796,576 A * | 8/1998 | Kim ...................... | 361/679.28 |
| 6,825,829 B1 * | 11/2004 | Albert et al. .................. | 345/107 |
| 6,897,855 B1 * | 5/2005 | Matthies et al. ............. | 345/204 |
| 2002/0070910 A1 | 6/2002 | Fujieda et al. | |
| 2003/0151562 A1 * | 8/2003 | Kulas .................... | G06F 3/1446 345/1.1 |
| 2005/0178034 A1 * | 8/2005 | Schubert et al. ............... | 40/605 |
| 2010/0177017 A1 * | 7/2010 | Zeng et al. ..................... | 345/1.1 |
| 2011/0216082 A1 * | 9/2011 | Caskey et al. ................ | 345/560 |
| 2011/0291915 A1 * | 12/2011 | Tani et al. ...................... | 345/1.3 |
| 2012/0147463 A1 | 6/2012 | Jung et al. | |
| 2013/0229324 A1 * | 9/2013 | Zhang ..................... | G09G 5/00 345/1.3 |

FOREIGN PATENT DOCUMENTS

| | | |
|---|---|---|
| JP | 4655368 | 6/2002 |
| KR | 10-2006-0090403 | 8/2006 |
| KR | 10-2012-0100881 | 9/2012 |

OTHER PUBLICATIONS

Digital Bookmark Samsung display targeted Future, http://www.yonhapnews.co.kr/bulletin/2012/11/29/0200000000AKR20121129043400003.HTML?from=search), Nov. 29, 2012.
Ji Yeong-Suk, Sticker Display, The Department of Information Display of Kyung Hee University, http://contest.samsungdisplay.com/page/prize/prize_2012_view03.html.

* cited by examiner

*Primary Examiner* — Larry Sternbane
(74) *Attorney, Agent, or Firm* — H.C. Park & Associates, PLC (57) ABSTRACT

An adhesive display system includes at least one adhesive display panel including a flexible display unit and an adhesive layer, at least one connector connected to the at least one adhesive display panel to apply a data driving signal thereto, and an external device configured to apply data to the at least one connector. The at least one adhesive display panel is connected to each other using the at least one connector.

14 Claims, 5 Drawing Sheets

ADHESIVE DISPLAY PANEL, CONNECTOR, AND ADHESIVE DISPLAY SYSTEM INCLUDING THE ADHESIVE DISPLAY PANEL AND CONNECTOR

RELATED APPLICATIONS

This application claims the benefit of Korean Patent Application No. 10-2013-0071945, filed on Jun. 21, 2013, in the Korean Intellectual Property Office, the entire content of which is incorporated herein in its entirety by reference.

BACKGROUND

1. Field

Exemplary embodiments of the present invention relate to an adhesive display panel, including an input connector and an adhesive display system that includes the display panel and the connector, In particular, exemplary embodiments of the present invention relate to an adhesive display system attachable to and detachable from a wall surface that is capable of being integration to form a large screen by connecting a plurality of transparent flexible display panels.

2. Description of the Background

A display device is device that, as part of its function, displays image signals from external inputs. Representative display devices may include televisions, computer monitors, personal digital assistants (PDAs), and a variety of widely available smart devices.

Typically, a high-definition flat display module such as an organic light-emitting display (OLED) panel, a liquid crystal display (LCD) panel, or a plasma display panel is used in the display device. These recent developments in display technology have made thinner display panels possible.

However, it is difficult to realize the advantages of thin display panels since space-consuming auxiliary hardware components, like those used to fix the display panel and arrange wiring, must be installed around the display panel. Additionally, as the size of the display panel increases, the cost of manufacturing the display panel increases dramatically due to expenses involved in wiring, making it costly to implement a large panel.

New technology is demanded to implement a light, thin, and integrated electronic information system. To this end, research has been actively conducted into system on glass (SOG) technology for integrating hardware components on a single substrate. The SOG technology allows various hardware elements for voice processing, display, data processing, storage, input/output, and communication to be integrated on a glass substrate. In current SOG technology, semiconductors are integrated on the glass substrate. Consequently, a display panel may include not only a driving circuit, but also a memory and a central processing unit (CPU). When current SOG technology is applied, a module in which a circuit is installed may be unnecessary. Therefore, display panels incorporating SOG technology may be very thin and all computing functions may be integrated in a flat panel.

SUMMARY

Exemplary embodiments of the present invention provide a transparent flexible display panel including an integrated processing unit.

Exemplary embodiments of the present invention also provide a display system in which a plurality of display panels may be connected to each other by clip-type connectors through which data may be relayed.

An exemplary embodiment of the invention provides an adhesive display system including at least one adhesive display panel including a flexible display unit and an adhesive layer, at least one connector connected to the adhesive display panel to that relays a data driving signal, and an external device configured to relay or supply data to the connector, wherein the adhesive display panel may be connected to another using a double sided connector.

The adhesive layer of the at least one adhesive display panel may be formed by applying an adhesive to one surface of the display unit. The adhesive layer may cover part or all of one surface of the display unit.

The flexible display unit and the at least one adhesive layer of the adhesive display panel may be transparent to transmit light therethrough.

The at least one connector may include a connection unit provided with a terminal unit that connects to a pad unit of the adhesive display panel, a fixing unit maintaining connection between the connection unit and an adhesive display panel, and a hinge unit connecting the connection unit to the fixing unit. The fixing unit may also have a rotating axis for changing an angle between the connection unit and the fixing unit, wherein the adhesive display panel may be fixed between the connection unit and the fixing unit.

At least one connector may be provided with two pairs of connection units and fixing units opposing each other about the hinge unit. The two pairs of opposed connection units and fixing units may be connected to different adhesive display panels.

The hinge unit may be connected to a wire, and at least one connector may be connected to the external device through the wire.

The adhesive display system may further include an additional external device configured to supply power to at least one connector, wherein at least one connector may relay power from the additional external device to the adhesive display panel.

At least one adhesive display panel may be attachable to and detachable from an external attaching surface using the adhesive layer.

The external device may divide an image signal and relay the divided signal to at least one connector.

A display part including a light-emitting device and a driving circuit for driving the display part may be arranged together on a substrate in the flexible display unit.

The flexible display unit may include a memory and a processor capable of processing information.

Another exemplary embodiment of the present invention provides an adhesive display panel that includes a transparent flexible display unit. The transparent flexible display unit may include a substrate, a display part, a driving circuit for driving the display part, and an adhesive layer arranged on one surface of the transparent flexible display unit, wherein the display part and the driving circuit may be arranged together on the substrate in the transparent flexible display unit.

The transparent flexible display unit may further include a processing unit, including a memory and a processor, on the substrate.

The adhesive display panel may be attachable to an external wall surface using the adhesive layer.

The adhesive display panel may be attachable to and detachable from an external attaching surface using the adhesive layer.

Still another exemplary embodiment of the present invention provides a connector including a connection unit. The connection unit may include a terminal unit capable of applying data to an adhesive display panel, a fixing unit for maintaining connection between the connection unit and the adhesive display panel, and a hinge unit for connecting the connection unit to the fixing unit. The hinge unit may include a rotating axis for changing an angle between the connection unit and the fixing unit, wherein the adhesive display panel is fixed between the connection unit and the fixing unit.

The connector may further include a wire connected to the hinge unit, wherein the hinge unit may supply the terminal unit with the data received from an external device through the wire.

The connector may be provided with two pairs of a connection unit and fixing unit opposing each other about the hinge unit. The two pairs of the connection units and fixing units may be connected to different adhesive display panels to apply different data thereto.

The hinge unit may relay power to the adhesive display panel.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION OF THE ILLUSTRATED EMBODIMENTS

In the detailed descriptions of the exemplary embodiments of present invention, reference will be made to the accompanying drawings illustrating specific embodiments of the present invention. The embodiments are described in detail so that those of ordinary skill in the art may carry out the present invention. It will be understood that the various embodiments of the present invention are different from each other, but are not necessarily mutually exclusive. For example, the specific shapes, structures, and characteristics described herein may be modified from one embodiment to another embodiment without departing from the spirit and scope of the present invention. Furthermore, it will be understood that positions or arrangements of individual elements in each embodiment may be modified without departing from the spirit and scope of the present invention. Therefore, the following detailed description should not be construed as being limitative. Thus, the scope of the present invention should be construed to cover the claims and equivalents thereof. Like reference numerals refer to like elements.

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present invention will be described in detail with reference to the accompanying drawings so that those of ordinary skill in the art may easily implement the present invention.

Figure 1:
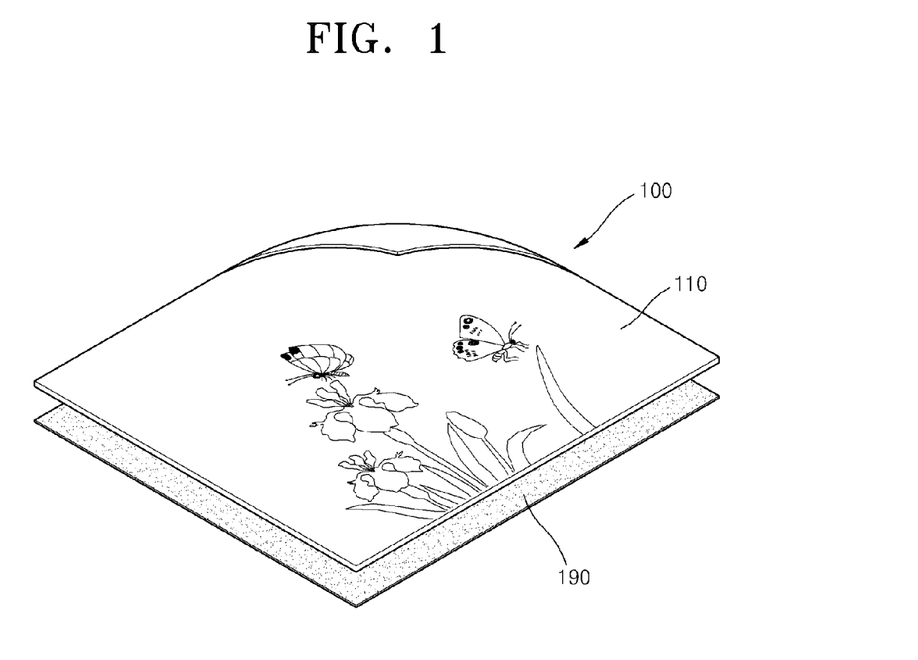
FIG. 1 schematically illustrates an adhesive display panel according to an embodiment of the present invention.

FIG. 1 schematically illustrates an adhesive display panel according to an embodiment of the present invention.

An adhesive display panel 100 includes a display unit 110 and an adhesive layer 190.

Figure 2:
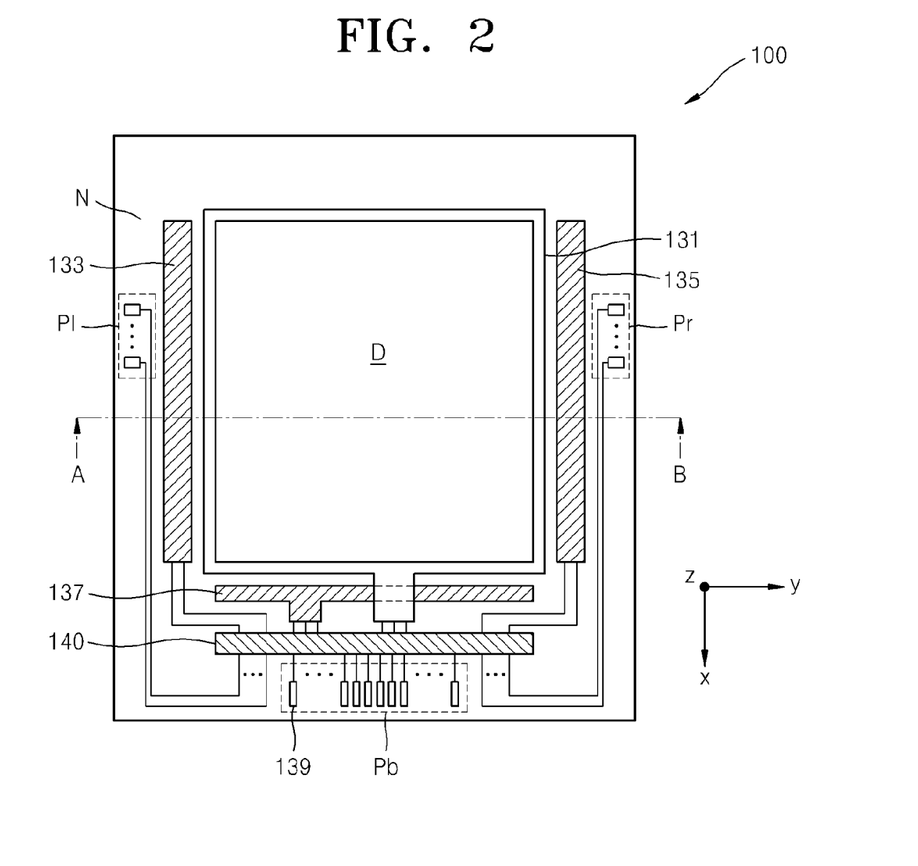
FIG. 2 is a diagram illustrating a cross section of the adhesive display panel according to an embodiment of the present invention.

The display unit 110 includes a display part D, as shown in FIG. 2, having a light-emitting device and a driving circuit for driving the display part D. The display unit 110 represents a region where data is received and light is emitted by driving the display part D. The display unit 110 may be flexible and transparent.

The display unit 110 may be one of a cathode ray tube (CRT), an electro luminescence (EL) device, a vacuum fluorescent display, a plasma display panel, a (LCD), a thin film transistor-liquid crystal display (TFT-LCD), an organic light-emitting diode (OLED), and an electrophoretic display.

As noted above, the display unit 110, may be flexible. In other words, the flexibility indicates that the display unit 110 may be bent by an external force. Since the adhesive display panel 100 may be flexible, the adhesive display panel 100 may not be damaged while being attached to or detached from a surface, such as a wall.

The adhesive layer 190 includes an adhesive material. The adhesive layer 190 may include any material for integrating homogeneous or heterogeneous solids by bonding surfaces of the homogeneous or heterogeneous solids. More specifically, a thermoplastic adhesive such as vinyl, acryl, or synthetic rubber may be used as the adhesive material. The adhesive layer 190 may have such adhesive strength that the display unit 110 is kept bonded to an external wall surface. The adhesive layer 190 may be thin and include a transparent material. Thus, it does not affect the flexibility and transparency of the display unit 110.

Although FIG. 1 illustrates that the adhesive layer 190 constitutes one layer, the adhesive layer 190 may be a thin film obtained by applying the adhesive material on one surface of the display unit 110.

The adhesive display panel 100 may be attached to a surface, such as an indoor or outdoor wall. The wall surface is not limited to an inner wall surface/outer wall surface of a building, and may include any spatial region on which a display can be bonded and installed. For example, the adhesive display panel 100 may be attached to a windscreen of a vehicle.

A conventional display may be installed and fixed by means of a stand or a screw, and is supplied with power and data through a wire. Due to the wiring and various tools for fixing the display, the display panel may not be installed on a wall surface even though a display panel is thin. On the contrary, the adhesive display panel according to exemplary embodiments of the present invention may adhere to an attaching surface without using additional installation hardware, so that the advantages of the small thickness and light weight of the display panel may be fully realized. Since the adhesive display panel 100 is transparent and flexible, the display may be viewed from both sides when the adhesive display panel 100 is attached to a transmissive surface such as glass, and the adhesive display panel 100 may not be damaged when being attached to or detached from the attaching surface.

FIG. 2 is a diagram illustrating a plan view of the adhesive display panel 100 according to an exemplary embodiment of the present invention.

Referring to FIG. 2, the adhesive display panel 100 includes the display part D and a non-display region N arranged at a perimeter of the display part D. Image signals are displayed on the display part D, and various display devices such as organic light-emitting devices, LCD devices, or electrophoretic display devices may be arranged in the display part D. The display part D will be described in more detail later. Although an active matrix (AM)-type panel is exemplarily used as the flexible display panel in an embodiment of the present invention, the present invention is not limited thereto. A passive matrix (PM)-type panel may also be used.

Various driving circuits and wirings for supplying image signals to the display device of the display part D may be arranged in the non-display region N.

Referring to FIG. 2, an electrode power supply line 131 for supplying electrode power ELVSS to the display part D is arranged in the non-display region N. A scanning circuit unit 133 for transferring a scanning driving signal to the display part D is arranged in the non-display region N, and a data circuit unit 135 for transferring a data driving signal to the display part D is also arranged in the non-display region N. In addition, a driving power wiring unit 137 for supplying driving power ELVDD to the display part D is arranged in the non-display region N.

The electrode power supply line 131, the scanning circuit unit 133, the data circuit unit 135, and the driving power wiring unit 137 may be arranged together on a substrate on which the non-display region N is formed, instead of being arranged on an additional substrate or a flexible printed circuit film.

A processing unit 140 connected to respective wirings of the electrode power supply line 131, the scanning circuit unit 133, the data circuit unit 135, and the driving power wiring unit 137 is arranged in the non-display region N. The processing unit 140 includes a memory and a central processing unit (CPU) so that the adhesive display panel 100 may perform a computing function. That is, the adhesive display panel 100 is capable of inputting and editing information through processing unit 140, whereas a conventional display panel simply outputs visual information.

The processing unit 140 serves to connect the wirings of the electrode power supply line 131, the scanning circuit unit 133, the data circuit unit 135, and the driving power wiring unit 137 to wirings of pad units Pb, Pl, and Pr. When receiving data and power from an external device through the pad units Pb, Pl, and Pr, the processing unit 140 converts the received data and power and transfers the converted data and power to the respective driving circuits 131, 133, 135, and 137. Additionally or alternatively, the processing unit 140 may simply provide a connection between wirings. For example, when receiving the driving power ELVDD through the pad units Pb, Pl, and Pr, the processing unit 140 may simply transfer the received power to the driving power wiring unit 137.

In the following description, the data received by the pad units Pb, Pl, and Pr may include any data needed to display an image on a display panel. Since the adhesive display panel 100 is provided with the processing unit 140 incorporating the processor, the adhesive display panel 100 may receive unprocessed image data and convert the data into a vertical synchronization signal Vsync, a horizontal synchronization signal Hsync, a data enable signal, and an image data signal DATA_in applied to the data circuit unit 135. Therefore, the data received by the pad units Pb, Pl, and Pr may be image data itself.

The pad units Pb, Pl, and Pr may also receive the vertical synchronization signal Vsync, the horizontal synchronization signal Hsync, the data enable signal, and the image data signal DATA_in. In this case, the processing unit 140 serves as a timing control unit. The processing unit 140 receives the vertical synchronization signal Vsync, the horizontal synchronization signal Hsync, the data enable signal, and the image data signal DATA_in, and outputs, to the data circuit unit 135, an RGB data signal obtained by converting the image data signal DATA_in in accordance with the structure of data circuit unit 135 and a clock signal. The processing unit 140 may output the RGB data signal to the data circuit unit 135 according to a differential signalling method, i.e. a low voltage differential signalling (LVDS) or reduced swing differential signalling (RSDS) method. In the case of using the RSDS method, six wirings for R, G, and B and two wirings for the clock signal may be used.

The processing unit 140 may output, to the scanning circuit unit 133, an output enable signal for controlling an output of the scanning circuit unit 133.

The electrode power supply line 131, the scanning circuit unit 133, the data circuit unit 135, the driving power wiring unit 137, and the processing unit 140 may be arranged together on the substrate on which the non-display region N is formed, instead of being arranged on an additional substrate or a flexible printed circuit film. This technology of integrating all elements on a single substrate is referred to as a system on glass (SOG) technology. That is, utilizing SOG technology, the adhesive display panel 100 may be reduced in thickness and may allow integration of computing functions in a single panel. In another embodiment of the present invention, all the elements in the non-display region N may be arranged in the display part D, utilizing SOG technology.

The pad units Pb, Pl, and Pr, in which terminals 139 are arranged, may be disposed under the processing unit 140. The terminals 139 of the pad units Pb, Pl, and Pr serve to receive and transfer inputs from an external device, and are connected to the processing unit 140. The terminals 139 of the pad units Pb, Pl, and Pr are used to supply power or data to the adhesive display panel 100. The number of the terminals may vary with a type of the adhesive display panel 100. Although it is illustrated that the pad units Pb, Pl, and Pr are respectively disposed at the bottom, the left, and the right of the display panel, the positions of the pad units Pb, Pl, and Pr may be changed.

In an embodiment of the present invention, the terminals 139 of the pad units Pb, Pl, and Pr are connected to a terminal unit 530 of connectors 500a and 500b described below (see FIG. 3). However, the terminals 139 may also be connected to other external devices.

The various circuits, wirings, and terminals described above with reference to FIG. 2 are merely exemplary elements arranged in the non-display region N. That is, the various circuits, wirings, and terminals of the non-display region N may be arranged in a different manner from that of FIG. 2.

The non-display region N may occupy a minimal space in comparison with the display part D. Alternatively, unlike the embodiment of FIG. 2, the non-display region N may overlap the display part D so that only the display part D is viewed when the adhesive display panel 100 is viewed from above an upper surface of the adhesive display panel 100, through the SOG technology.

Since the terminals 139 of the pad units Pb, Pl, and Pr are connected to an external device, the adhesive display panel 100 may receive data and power. The terminals 139 may be connected to the clip-type connectors 500a and 500b. Clip-type connectors 500a and 500b may be configured to correspond to an attachment to each of at least one of pad units Pb, Pl, and Pr.

Figure 3:
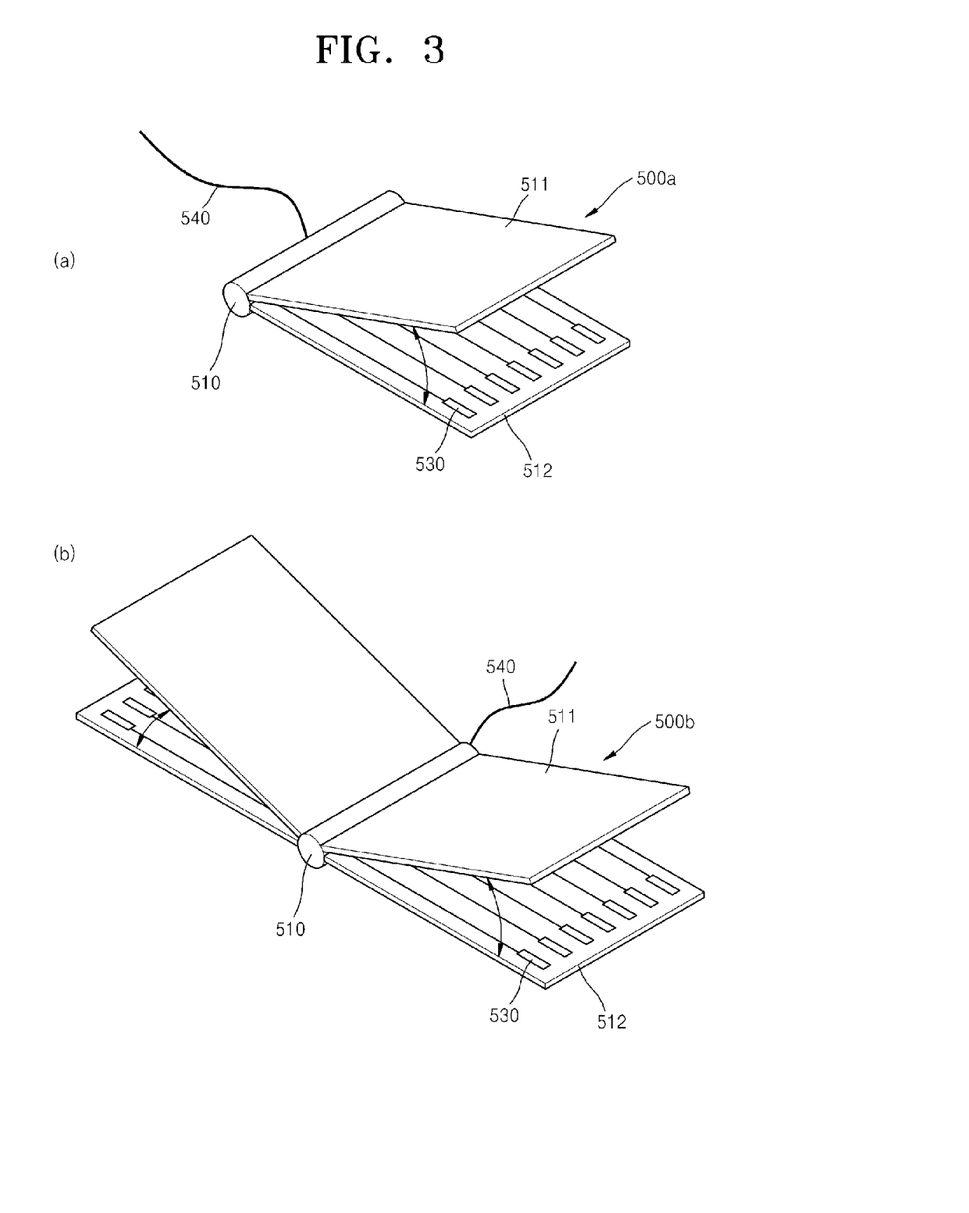
FIG. 3 is a schematic diagram illustrating a connector according to an embodiment of the present invention.

FIG. 3 is a schematic diagram illustrating a connector according to an embodiment of the present invention.

Referring to FIG. 3, the single-sided connector 500a may include a hinge unit 510, a fixing unit 511, a connection unit 512, a wire 540, and a plurality of terminal units 530 provided to the connection unit 512.

The hinge unit 510 connects the fixing unit 511 to the connection unit 512, and serves as a rotating axis for changing an angle between the fixing unit 511 and the connection unit 512. The hinge unit 510 may supply each terminal unit 530 with data and power received through the wire 540.

The fixing unit 511 forms a variable angle with the connection unit 512, and serves to fix the single-sided connector 500a so that the terminal units 530 of the connection unit 512 are kept connected to the pad units Pb, Pl, and Pr when the single-sided connector 500a is connected to the adhesive display panel 100. That is, the fixing unit 511 together with the connection unit 512 provides a clip-type detachable structure for fixing the adhesive display panel 100. As the fixing unit 511 and the connection unit 512 are opened or closed, the terminal units 530 of the connection unit 512 may be separated from or fixed to the terminals 139 of the pad units Pb, Pl, and Pr.

The connection unit 512 contacts the adhesive display panel 100 to supply data and power. The connection unit 512 includes at least one terminal unit 530. The terminal units 530 may contact the terminals 139 of the pad units Pb, Pl, and Pr of the adhesive display panel 100 to supply data and power. More specifically, the terminal units 530 may contact the terminals 139 to transfer the driving power ELVDD, the electrode power ELVSS, and data for displaying an image.

Although seven terminal units 530 are illustrated in FIG. 3(A), the number of the terminal units 539 may be changed according to a type of the adhesive display panel 100 and an amount of the data or power to be transferred. Distances among the terminal units 530 may be determined according to distances among the terminals 139 of the pad units Pb, Pl, and Pr.

The hinge unit 510 may be supplied with power and data from an external device through the wire 540. The hinge unit 510 transfers the received power and data to the terminal units 530 of the connection unit 512.

FIG. 3(B) is a diagram illustrating the double-sided connector 500b according to another embodiment of the present invention. Referring to FIG. 3(B), a pair of fixing units 511 and a pair of connection units 512 are provided to both sides of the single hinge unit 510. That is, the two connection units 512 oppose each other about the hinge unit 510, and the two fixing unit 511 oppose each other about the hinge unit 510. Angles between the fixing units 511 and the connection units 512 may be independently determined. Power and data transferred to the terminal units 530 of both the connection units 512 may be independent. That is, the data transferred to the terminal units 530 of the left-side connection unit 512 may be different from the data transferred to the terminal units 530 of the right-side connection unit 512.

The fixing units 511 and the connection units 512 may be connected to different adhesive display panels. For example, the left-side fixing unit 511 and the left-side connection unit 512 may be connected to the first adhesive display panel 100 and the right-side fixing unit 511 and the right-side connection unit 512 may be connected to a second adhesive display panel 100, so that the first and second adhesive display panels 100 and 20 may be connected to each other through the double-sided connector 500b.

Figure 4:
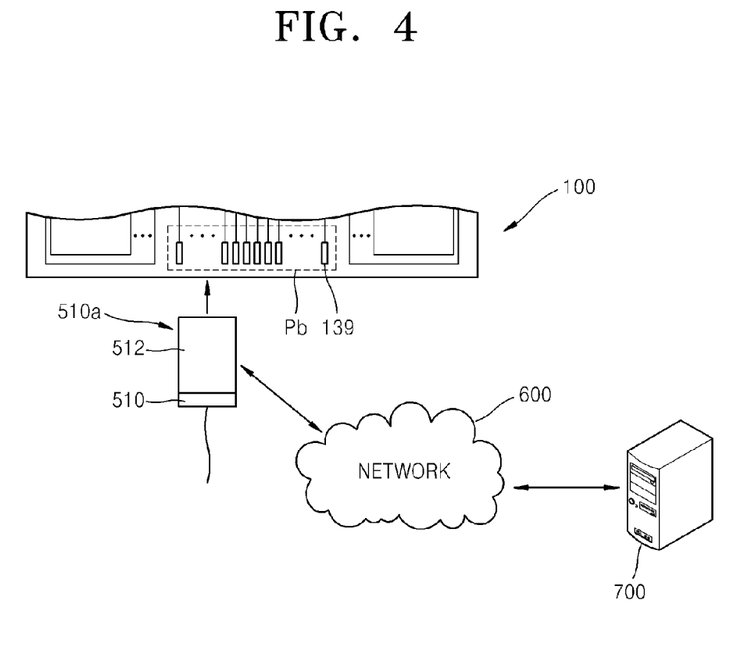
FIG. 4 is a schematic diagram illustrating the connector connected to the adhesive display panel, according to an embodiment of the present invention.

FIG. 4 is a schematic diagram illustrating the connector 510a connected to the adhesive display panel, according to an embodiment of the present invention.

Referring to FIG. 4, the single-sided connector 500a of the present invention may be connected to the lower-side pad unit Pb disposed at the bottom of the adhesive display panel 100. Since the connector 500a includes the seven terminal units 530 according to the embodiment illustrated in FIG. 3, the single-sided connector 500a may be connected to seven terminals 139 of the lower-side pad unit Pb. The single-sided connector 500a connected to the lower-side pad unit Pb may be connected to a different location. FIG. 4 exemplarily illustrates that the connection unit 512 faces upward so that the terminal units 530 arranged on the connection unit 512 electrically contact the terminals 139 of the pad unit Pb.

The single-sided connector 500a may be connected to not only the lower-side pad unit Pb but also the left-side pad unit Pl or the right-side pad unit Pr. Alternatively, the connector connected to the pad units Pb, Pl, and Pr may be the double-side connector 500b.

The single-sided connector 500a transfers power and data to the adhesive display panel 100 through the terminal units 530 of the connection unit 512. The terminals 139 of the adhesive display panel 100 connected to the terminal units 530 of the connection unit 512 may receive power or data according to a transmission standard.

The single-sided connector 500a receives power that is to be supplied to the adhesive display panel 100, from an external device through the wire 540. The power received through the wire 540 may include the electrode power ELVSS and the driving power ELVDD.

The single-sided connector 500a may receive data that is to be applied to the adhesive display panel 100, through the wire 540. The data to be applied to the adhesive display panel 100 may be an image signal or a driving signal of the display panel. According to an embodiment of the present invention, when the image signal is transferred to the adhesive display panel 100, the processing unit 140 may convert the image signal into a signal to be applied to the scanning circuit unit 133 and the data circuit unit 135 since the memory and the CPU are included in the processing unit 140.

According to an embodiment of the present invention, the single-sided connector 500a may receive data from an external device 700 through a network 600. The network 600 may be a wired network including the wire 540 and connecting the connector 500a to the external device 700. Although a wired connection is illustrated between connector 500a and external device 700, the device is not limited thereto, and wireless connections are also possible. For example an embodiment having a wireless connection may include an integrated battery unit and be configured to accept data wirelessly.

Figure 5:
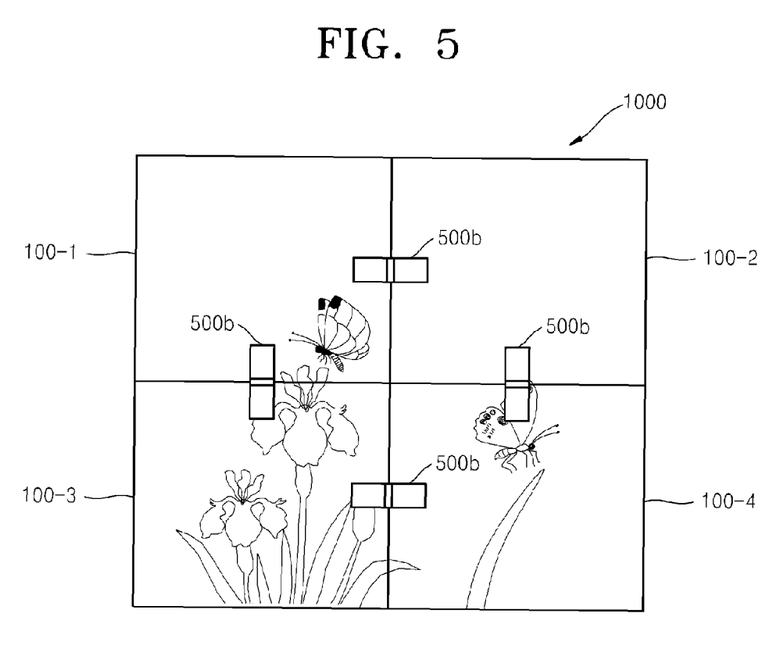
FIG. 5 illustrates adhesive display panels that are connected to each other according to an embodiment of the present invention.

The adhesive display panel 100 may be connected to another adhesive display panel 100 through the connectors 500a and 500b as illustrated in FIG. 5. In the case of implementing a large screen display by connecting a plurality of adhesive display panels 100, data and power should be received from an external device to provide for stable operations. In this case, the data and power may be received from the external device 700 through the network 600.

In order to generate one image on the plurality of connected adhesive display panels 100, a divider may be used to divide the image by the number of the display panels. The external device 700 may serve as a divider for dividing the image to be displayed on the plurality of adhesive display panels 100. In addition, the external device 700 may externally perform a function of the processing unit 140 of the adhesive display panel 100, or may serve to complement the function of the processing unit 140. Alternatively, the external device 700 may be a power supply device. Any device that is capable of performing these functions may be utilized as the external device 700.

FIG. 5 illustrates adhesive display panels that are connected to each other according to an embodiment of the present invention.

Referring to FIG. 5, an adhesive display system 1000 forms one image using the plurality of connected adhesive display panels 100. The plurality of adhesive display panels 100-1 to 100-4 may be connected to each other by the double-sided connector 500b. For example, the first adhesive display panel 100-1 is connected to the third display panel 100-3 by the double-sided connector 500b through the lower-side pad unit Pb, and is connected to the second adhesive display panel 100-2 by the double-sided connector 500b through the right-side pad unit Pr. Each of the adhesive display panels 100-1 to 100-4 receives power and data from the terminal units 530 of the connector 500b to display an image. The wire of the connector 500b may be connected to a back surface of the adhesive display panel 100.

FIG. 5 illustrates four adhesive display panels 100-1 to 100-4, but the present invention is not limited thereto. Therefore, a plurality of adhesive display panels may be connected to each other by the connectors 500a and 500b.

The adhesive display panel 100 of the present invention can be attached to an outer wall or glass wall of a building, and thus can be easily installed. Furthermore, by connecting the adhesive display panels 100 to each other using the connectors 500a and 500b, a large screen display can be implemented. Moreover, since power and data can be simply input to the adhesive display panel 100 by using the clip-type connectors 500a and 500b, complicated wiring is not necessary. A person having skill in the art will appreciate that this arrangement clip-type connectors is merely exemplary, and the connectors can have different shapes and arrangements based on the positions of the terminals and adhesive panel displays.

Specific executions described herein are merely examples and do not limit the scope of the present invention in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connections, physical connections or circuit connections. In addition, the described elements may not be inevitably required elements for the application of the present invention unless they are specifically mentioned as being "essential" or "critical."

The singular forms "a," "an" and "the" in this present disclosure, and in particular, in the claims, may be intended to include the plural forms as well. Unless otherwise defined, the ranges defined herein is intended to include any invention to which values within the range are individually applied and may be considered to be the same as individual values constituting the range in the detailed description of the present invention. Finally, operations constituting the method of the present invention may be performed in appropriate order unless explicitly described in terms of order or described to the contrary. The present invention is not necessarily limited to the order of operations given in the description. The examples or exemplary terms (for example, etc.) used herein are to merely describe the present invention in detail and not intended to limit the present invention unless defined by the following claims. Furthermore, those of ordinary skill in the art will readily appreciate that many alternations, combinations and modifications, may be made according to design conditions and factors within the scope of the appended claims and their equivalents.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An adhesive display system, comprising:
   at least one adhesive display panel comprising a flexible display unit and an adhesive layer; and
   at least one connector connected to the at least one adhesive display panel, the at least one connector configured to receive and apply a data driving signal to the at least one adhesive display panel, wherein:
   the at least one adhesive display panel is connected to another adhesive display panel using the at least one connector;
   the at least one connector comprises:
      a connection unit comprising a terminal unit connected to a pad unit of the adhesive display panel;
      a fixing unit maintaining connection between the connection unit and the at least one adhesive display panel; and
      a hinge unit connecting the connection unit to the fixing unit and comprising a rotatable axis configured to change an angle between the connection unit and the fixing unit; and
   a part of the adhesive display panel is fixed between the connection unit and the fixing unit.

2. The adhesive display system of claim 1, wherein the adhesive layer comprises an adhesive disposed on one surface of the flexible display unit.

3. The adhesive display system of claim 1, wherein the flexible display unit and the adhesive layer are transparent.

4. The adhesive display system of claim 1, wherein:
   the at least one connector is provided with opposed pairings comprising the connection unit and the fixing unit opposing each other about the hinge unit; and
   the opposed pairings are connected to different adhesive display panels.

5. The adhesive display system of claim 1, further comprising an external device, wherein the hinge unit is connected to a wire, and the at least one connector is connected to the external device through the wire, the external device being configured to provide the data driving signal.

6. The adhesive display system of claim 1, wherein the pad unit is configured to receive data and power from the at least one connector.

7. The adhesive display system of claim 1, further comprising:
   a first external device configured to provide the data driving signal; and
   a second external device configured to supply power to the at least one connector,
   wherein the at least one connector is configured to apply the power supplied from the second external device to the adhesive display panel.

8. The adhesive display system of claim 1, wherein the at least one adhesive display panel is attachable to and detachable from an external attaching surface using the adhesive layer.

9. The adhesive display system of claim 1, further comprising:
an external device configured to provide the data driving signal,
wherein the external device is configured to divide an image signal and apply the divided signal to the at least one connector.

10. The adhesive display system of claim 1, wherein a display part comprising a light-emitting device and a driving circuit configured to drive the display part are arranged together on a substrate of the flexible display unit.

11. The adhesive display system of claim 1, wherein the flexible display unit comprises a memory and a processor configured to process information.

12. A connector, comprising:
a connection unit comprising a terminal unit configured to apply data to an adhesive display panel;
a fixing unit configured to maintain a connection between the connection unit and the adhesive display panel; and
a hinge unit connecting the connection unit to the fixing unit and comprising a rotatable axis configured to change an angle between the connection unit and the fixing unit, wherein:
the connector is configured to receive the adhesive display panel between the connection unit and the fixing unit;
the connector is provided with two opposed pairings, each of the two opposed pairings comprising a connection unit and a fixing unit opposing each other about the hinge unit; and
the opposed pairings are connected to different adhesive display panels to independently apply data thereto.

13. The connector of claim 12, further comprising:
a wire connected to the hinge unit, wherein the hinge unit is configured to supply the terminal unit with data received from an external device through the wire.

14. The connector of claim 12, wherein the hinge unit is configured to apply power to the adhesive display panel.

* * * * *